(12) United States Patent
Jurkat et al.

(10) Patent No.: US 7,826,988 B2
(45) Date of Patent: Nov. 2, 2010

(54) METHOD AND APPARATUS FOR DETERMINING A CHARACTERISTIC CURVE FOR AN ELECTRIC VARIABLE OF A WIND ENERGY PLANT

(75) Inventors: Mark Jurkat, Norderstedt (DE); Ulrich Harms, Hamburg (DE)

(73) Assignee: Nordex Energy GmbH, Norderstedi (DE)

( * ) Notice: Subject to any disclaimer, the term of this patent is extended or adjusted under 35 U.S.C. 154(b) by 0 days.

(21) Appl. No.: 11/873,872

(22) Filed: Oct. 17, 2007

(65) Prior Publication Data
US 2009/0033313 A1 Feb. 5, 2009

(51) Int. Cl.
*G01R 21/06* (2006.01)
(52) U.S. Cl. .............................. 702/60; 702/64; 702/66; 702/145; 702/189; 700/286; 290/55
(58) Field of Classification Search .................... 702/60, 702/64, 66, 79, 142, 145, 182, 189; 700/286; 290/55
See application file for complete search history.

(56) References Cited

U.S. PATENT DOCUMENTS

| | | | |
|---|---|---|---|
| 6,856,039 B2 * | 2/2005 | Mikhail et al. | ................. 290/44 |
| 6,925,385 B2 * | 8/2005 | Ghosh et al. | .................. 702/14 |
| 7,259,471 B2 * | 8/2007 | Basteck | ....................... 290/43 |

FOREIGN PATENT DOCUMENTS

EP   103 23 785 A1   12/2004

OTHER PUBLICATIONS

Simonsen, 'Regional Wind Energy Analysis for the Central United States', 2004, UNDEERC Publication, pp. 1-15.*
Wilch et al., 'Reactive Power Generation by DFIG Based Wind Farms with AC Grid Connection', 2007, IEEE Publication, pp. 1-7.*

* cited by examiner

*Primary Examiner*—Mohamed Charioui
*Assistant Examiner*—Elias Desta
(74) *Attorney, Agent, or Firm*—Vidas, Arrett & Steinkraus

(57) ABSTRACT

The present invention is related to a method for determining a characteristic curve (9) for an electric variable ($P_{el}$, Q, φ, cos φ, $I_P$, $I_Q$) of a wind energy plant (1). According to the present invention, it is provided that at least one characteristic value of the electric variable ($P_{el}$, Q, φ, cos φ, $I_P$, $I_Q$) is measured for at least one value of the wind ($v_W$), and for the at least one value of the wind ($v_W$), a characteristic value of the electric variable ($P_{el}$, Q, φ, cos φ, $I_P$, $I_Q$) is adapted from a predetermined characteristic curve (7) containing characteristic values of the electric variable ($P_{el}$, Q, φ, cos φ, $I_P$, $I_Q$) as a function of different values of the wind ($v_W$), taking into account the characteristic value measured for the at least one value of the wind ($v_W$).

10 Claims, 2 Drawing Sheets

METHOD AND APPARATUS FOR DETERMINING A CHARACTERISTIC CURVE FOR AN ELECTRIC VARIABLE OF A WIND ENERGY PLANT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a method for determining a characteristic curve for an electric variable of a wind energy plant, wherein the characteristic curve contains characteristic values of the electric variable as a function of different values of the wind. Moreover, the present invention is related to an apparatus for determining a characteristic curve for an electric variable of a wind energy plant, wherein the characteristic curve contains characteristic values of the electric variable as a function of different values of the wind.

With increasing capacity of wind energy plants and the combination thereof to wind parks, there is a demand to be able to regulate or control, respectively, the feeding of electric power into the grid. For this purpose, it is known to operate wind energy plants and wind parks with a throttled power, when no higher power can or is to be fed into the grid. In a throttled operation of the wind energy plant, there is a demand to determine the existing control reserve of an electric variable, like the effective power of the wind energy plant for instance. Therefore, characteristic curves for electric variables are established for wind energy plants, before the distribution of the plant for instance, wherein the characteristic curves contain characteristic values of the electric variable as a function of different values of the wind, different wind velocities for instance. Such characteristic curves are also designated as predetermined characteristic curves.

For instance, such characteristic curves can be calculated or preferably experimentally established for a reference wind energy plant of the respective plant type by determining characteristic values of the electric variable for the reference plant at different wind velocities. In doing so, a problem is that depending on production variations for instance, differences of the characteristic curve of an individual wind energy plant with respect to the characteristic curve established for the reference wind energy plant may result. Thus, higher as well as lower characteristic values for the electric variable than indicated in the predetermined characteristic curve may result for an individual wind energy plant.

Therefore, it has been proposed to establish an individual characteristic curve for each wind energy plant before the distribution. Admittedly, it came out that depending on geographic or other conditions of the operation of the wind energy plant on the later installation site, for instance, other characteristic values of the electric variable than have been established for the individually predetermined characteristic curve may result in turn. Therefore, the predetermined characteristic curve is not always sufficiently reliable.

It has furthermore been tried to establish the predetermined characteristic curve experimentally not before the wind energy plant is installed at the installation location. A disadvantage of this procedure is however that the characteristic curve of the wind energy plant is available only after a relatively long measuring period, i.e. when characteristic values of the electric variable could have been measured for a sufficient number of different wind velocities. Through this, the start-up of the wind energy plant in its full extent is delayed.

Therefore, the present invention is based on the objective to provide a method and an apparatus of the kind indicated in the beginning, by which a more reliable characteristic curve for an electric variable of a wind energy plant can be established without that delays in the start-up of the wind energy plant occur.

BRIEF SUMMARY OF THE INVENTION

The present invention resolves the problem with respect to the initially mentioned method in that at least one characteristic value of the electric variable is measured for at least one value of the wind, and for the at least one value of the wind, a characteristic value of the electric variable from a predetermined characteristic curve containing characteristic values of the electric variable as a function of different values of the wind is adapted, taking into account the characteristic value measured for the at least one value of the wind.

For the apparatus mentioned in the beginning, the present invention resolves the problem in that a measuring equipment is provided, by which at least one characteristic value of the electric variable can be measured for at least one value of the wind, and an analysing equipment, by which a characteristic value of the electric variable from a predetermined characteristic curve containing characteristic values of the electric variable as a function of different values of the wind is adaptable for the at least one value of the wind, taking into account the characteristic value measured for the at least one value of the wind Thus, the present invention is based on the concept to establish a characteristic curve for an electric variable of the wind energy plant, a characteristic curve of the power for instance, by adapting a predetermined characteristic curve to really prevailing operation conditions through an adaptation of the characteristic values. In this, the predetermined characteristic curve can be a characteristic curve associated to the reference wind energy plant. Yet, the predetermined characteristic curve may have been also established individually for the respective wind energy plant before the distribution of the wind energy plant. With the characteristic value of the electric variable it is matter of a value of the electric variable which results at a certain value of the wind in a not throttled operation of the wind energy plant. Thus, the characteristic value provides an information about the maximum obtainable value of the electric variable at a certain value of the wind. With the characteristic value, it may be matter of a value averaged about a time interval, which can also be exceeded or fallen below for a short time in the operation In the operation of the plant, one or more characteristic values of the electric variable are measured for different values of the wind or for the same value of the wind. A value of the wind may in particular also be a portion or an interval of a parameter describing the wind, like a certain wind velocity portion for instance. In particular, the abscissa of the characteristic curve indicating the value of the wind can be subdivided into portions or intervals, which can then be successively filled with measured characteristic values. Thus, in the spirit of the invention, characteristic values for a certain value of the wind comprise in particular characteristic values for such a certain interval or portion of a parameter describing the wind, like a wind velocity portion.

The measurement of the characteristic values can be performed on the location of the wind energy plant in particular. Based on the measured characteristic values, the predetermined characteristic curve can be successively adapted to the conditions in fact prevailing on the installation location, by establishing an adapted characteristic value on the basis of the already measured values. Even an adaptation to plant-specific peculiarities takes place in this manner. The more measured values there are with time, the better the predetermined characteristic curve can be adapted. For this purpose, the measured characteristic values for the electric variable can be recorded one after the other in different portions of the parameter describing the wind of the measured characteristic curve, and the optimisation is carried out on this basis.

According to the invention, by operating the plant at first on the basis of the predetermined characteristic curve when starting up, the wind energy plant can be instantly started up in its full extent on the location. Thus, the respective characteristic value from the predetermined characteristic curve can be selected as the adapted characteristic value in particular, as long as there is no characteristic value of the electric variable measured on the installation location for a value of the wind. As a consequence, power reserves of the plant can be established at first by means of the predetermined characteristic curve instantly after starting up. With increasing number of measured characteristic values, the predetermined characteristic curve can be adapted more and more completely and better to the actual operation conditions of the plant. Thus, based on a predetermined characteristic curve, a successive optimisation of the characteristic curve takes place.

In the experimental determination of a predetermined characteristic curve, a series of characteristic values is usually measured, which serve as basic values of the characteristic curve thereafter. Between these basic values, the predetermined characteristic curve is usually interpolated. In the scope of the invention, the characteristic values of the predetermined characteristic curve to be adapted comprise also such values in particular, which are no basic values but have been determined due to an interpolation instead.

According to the present invention in particular, a plurality of characteristic values of the electric variable can be measured or be measurable by the measurement equipment. In this, a plurality of characteristic values can be measured for the same value of the wind and/or for different values of the wind. With increasing number of measured values for the same value of the wind in particular, the reliability of the measurement result is increased. The influence of outliers on the measurement becomes smaller with increasing number of measurements.

It may also be provided that it is interpolated between already adapted characteristic values of the characteristic curve, i.e. basic values of the characteristic curve, and the characteristic curve is completed in this way.

For measuring the wind, one or more wind measurement masts can be provided in particular, which measure a value of the wind, the wind velocity for instance.

The characteristic curve determined according to the present invention may then be limited in a desired manner through certain operation states, like a manual power reduction for the feeding into an electric grid for instance.

According to a preferred embodiment of the invention, the characteristic value of the predetermined characteristic curve and the at least one measured characteristic value can enter weightedly in a calculation of the adapted characteristic value. Thus, in this case the significance of the measured values can be taken into account by a corresponding weighting. According to an embodiment particularly suited for practice, it may be provided that the adapted characteristic value is calculated by calculating a weighted arithmetic mean of the characteristic value of the electric variable from the predetermined characteristic curve and the at least one measured characteristic value.

According to a further embodiment, the number of the characteristic values of the electric variable measured for one value of the wind can be established and the adaptation of the characteristic value can be performed depending on the number of the measured characteristic values measured for the respective value of the wind. With this embodiment, it is possible in particular to conclude on the significance of the measurement from the number of measured values for the same value of the wind. Thus, below a limit number for instance, the predetermined characteristic value as well as the measured characteristic value(s) can enter into the calculation of the adapted characteristic value.

In particular, it is possible to perform a weighted calculation of the adapted characteristic value, for instance of a weighted arithmetic mean of the characteristic value of the predetermined characteristic curve and the measured characteristic value, when the number of the characteristic values of the electric variable measured for the respective value of the wind is below a limit number. In this embodiment, a limit number of measurements for a certain value of the wind is set, below which the measured values as well as the respective predetermined value of the characteristic curve enter weightedly in a corresponding manner into the calculation of the adapted value.

In practice, a value of 80 or 100 measured values for one value of the wind has proven to be suitable for the limit number.

According to a further embodiment of the invention, the measured characteristic value of the electric variable can enter with the weight $$\frac{1}{n_{Ges}}$$

into a calculation of the adapted characteristic value, and the characteristic value of the electric variable from the predetermined characteristic curve can enter with the weight $$\frac{n_{Ges} - n}{n_{Ges}}$$

into the calculation of the adapted characteristic value, wherein n is the number of the characteristic values of the electric variable measured for the respective value of the wind ($v_W$), and $n_{Ges}$ is a number which is greater than n or equal to n. In this selection of the weights, the predetermined characteristic value has less influence on the adapted characteristic value in the extent as there are more measured values for the value of the wind of this characteristic value. In particular when there is no measurement for a value of the wind yet, thus n is zero, as a consequence, only the predetermined characteristic value is taken into account for the adaptation, i e. the predetermined characteristic value is also set as adapted characteristic value. In the contrary, when n is equal to $n_{Ges}$ or greater, only the measured characteristic values are taken into account for the adaptation of the characteristic value. Then, the predetermined characteristic value does not enter into the adaptation any more, its weight is zero.

According to a particularly preferred embodiment, the number $n_{Ges}$ can be equal to the limit number below which the measured characteristic values as well as the predetermined characteristic value, also weightedly, enter into the calculation of the adapted characteristic value.

It can be provided that after reaching a limit number of characteristic values of the electric variable measured for one value of the wind, the characteristic value of the predetermined characteristic curve for this value of the wind is adapted by setting the arithmetic mean of the measured characteristic values as the adapted characteristic value for this value of the wind. In this embodiment, the predetermined characteristic value enters no more enter into the determination of the adapted characteristic value, provided that the limit number of measurements has been exceeded. In this, the limit number is selected such that there is a sufficient significance of the measurements. In particular, as a matter of course the same limit number can be provided as a threshold below which the measured characteristic values as well as the predetermined characteristic value enter into the determination of the adapted characteristic value, and above which only the measured characteristic values enter into the determination of the adapted characteristic value.

The electric variable can be the electric power of the wind energy plant, the generated effective power $P_{el}$ of the wind energy plant in particular. However, it is also conceivable that the electric variable is alternatively or in addition the generated reactive Power Q of the wind energy plant and/or the phase angle $\phi$ and/or the power factor $\cos \phi$ and/or the effective current $I_P$ and/or the reactive current $I_Q$ or another electric variable.

In particular, the value of the wind can be the wind velocity and/or a wind velocity interval. However, in addition or alternatively, even other values of the wind, for instance the wind direction, the air pressure, the air humidity and so on can be taken into account.

The apparatus of the present invention is equipped in particular for the execution of the method of the invention,

BRIEF DESCRIPTION OF THE SEVERAL VIEWS OF THE DRAWINGS

In the following, the present invention is explained in more detail by means of a drawing representing an example of its realisation. Schematically shown is in FIG. 1 a wind energy plant with an apparatus according to the present invention, FIG. 2 a diagram for the illustration of the adaptation of the predetermined characteristic curve, FIG. 3 an enlarged cut-out of the diagram depicted in FIG. 2.

DETAILED DESCRIPTION OF THE INVENTION

Figure 1:
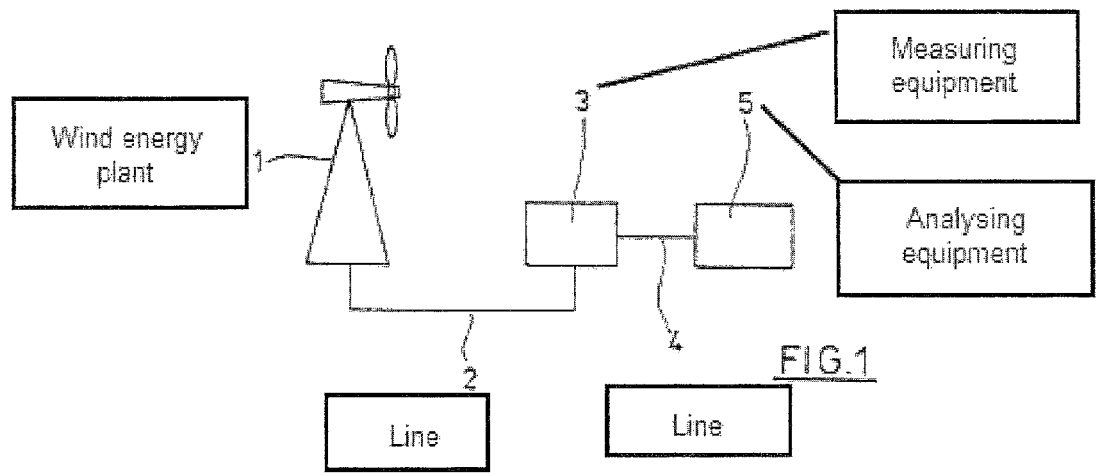

While this invention may be embodied in many different forms, there are described in detail herein a specific preferred embodiment of the invention This description is an exemplification of the principles of the invention and is not intended to limit the invention to the particular embodiment illustrated In FIG. 1, a wind energy plant 1 is schematically depicted. Via a suitable line 2, the wind energy plant 1 is connected to a measuring equipment 3, by which a characteristic value of the effective power generated by the wind energy plant 1 can be measured for different wind velocities in the depicted example. The measuring equipment 3 may also be integrated into the wind energy plant 1. In order to measure the wind velocity, wind measuring equipments not shown in more detail are provided. Via a further line 4, the measuring equipment 3 is connected to an analysing equipment 5, by which characteristic values of the effective power from a predetermined characteristic curve containing characteristic values of the effective power as a function of different wind velocities are adaptable for different wind velocities, taking into account the characteristic values measured for the respective wind velocities. Even the analysing equipment 5 may be integrated into the wind energy plant 1.

The function of the apparatus according to the present invention will be explained by means of the diagrams depicted in FIG. 2 and 3. In each of the diagrams, the measured wind velocity $v_W$ is indicated in m/s on the X-axis On the Y-axis on the left side in the diagrams, the generated effective power $P_{el}$ of the wind energy plant 1 is plotted in kW.

A predetermined characteristic curve 7 for the effective power, individually established for the plant 1 before the distribution and the installation of the plant 1, can be recognised in the diagrams. The experimentally established basic values of the predetermined characteristic curve 7 indicate the characteristic value of the effective power $P_{el}$ for the respective wind velocity $v_W$. The basic values of the predetermined characteristic curve 7 are each one represented in the form of a rhomb. Between the basic values, the predetermined characteristic curve 7 for the power was interpolated.

For different wind velocities $v_W$, respective characteristic values of the effective power $P_{el}$ were measured on the installation location of the plant 1. In the depicted example, the abscissa of the diagrams which indicates the wind velocity was subdivided into portions of 0.5 m/s. In this, measured characteristic values for wind velocities situated in the same portion were taken into account as characteristic values for the same value of the wind, i e. the same wind energy portion. The basic values of the measured characteristic value curve are represented as squares in the diagrams. These can be calculated from the characteristic values measured for the respective wind velocity portion, by an averaging for instance. A measured value curve 8 for the maximum effective power of the plant 1 at different wind velocities $v_W$ was established by interpolation between the basic values.

Figure 2:
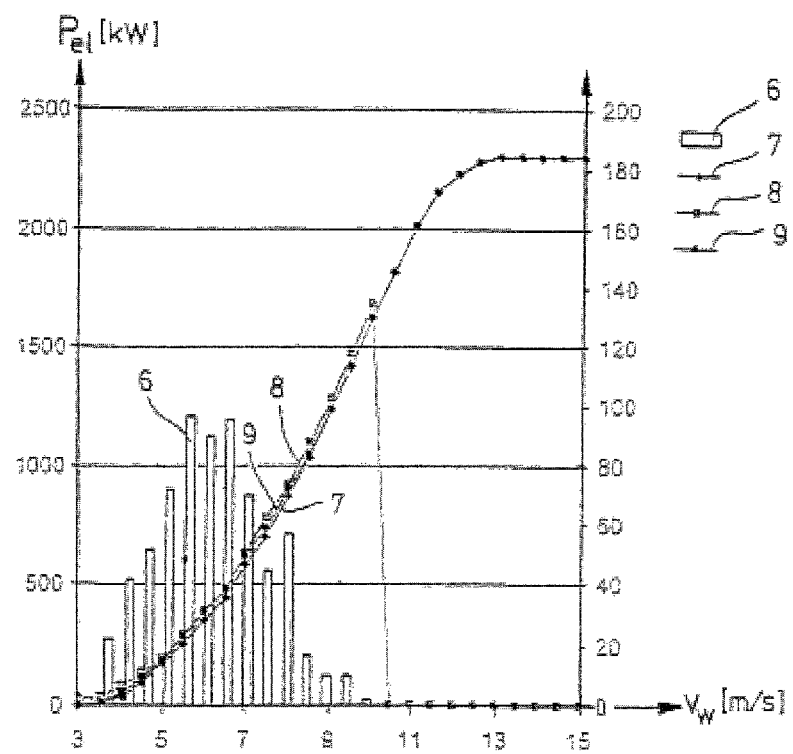
Figure 3:
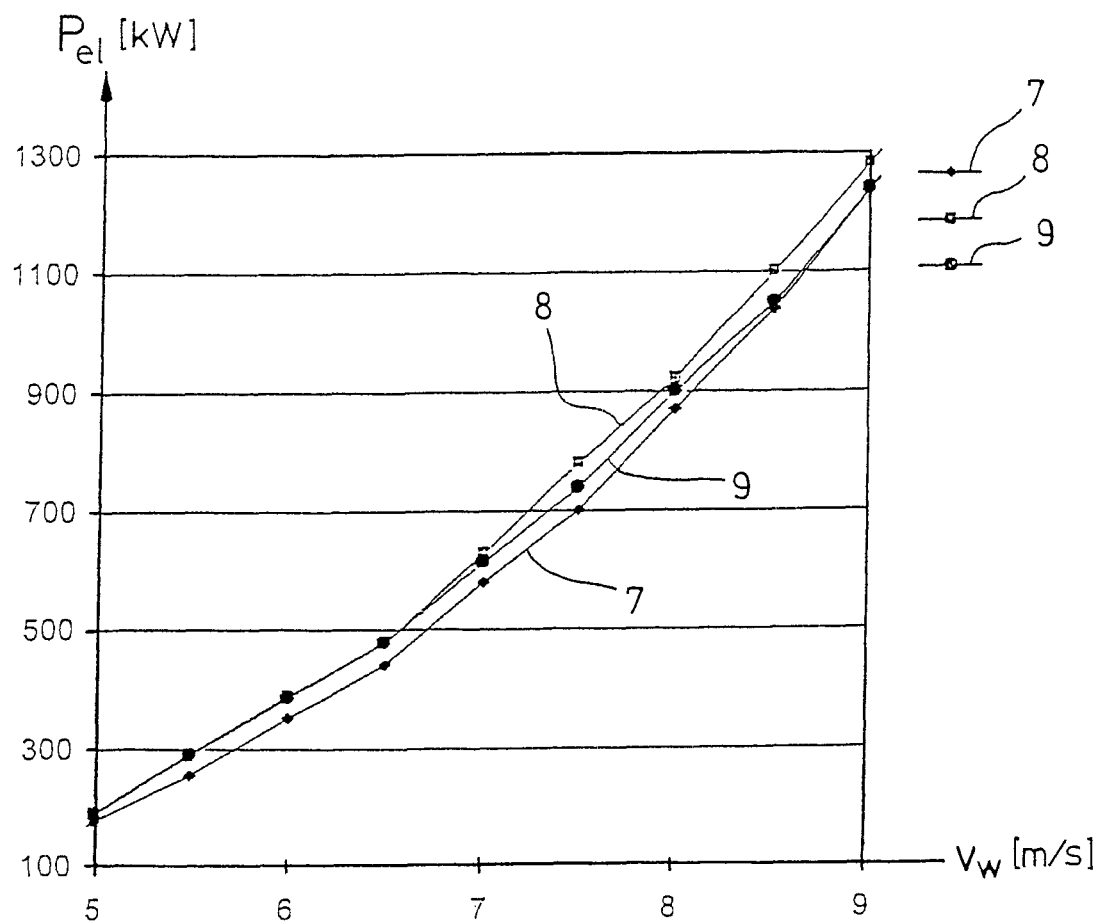

In the diagram shown in FIG. 2, the number n of the characteristic values of the effective power $P_{el}$ measured for the different wind velocity portions is plotted on an additional right-side Y-axis, besides to the effective power $P_{el}$ plotted on the left-side Y-axis. The number n of the measurements for the respective wind velocity portion is represented by corresponding bars 6 in the diagram in FIG. 2. It can be recognised that at frequently occurring wind velocities between 4 and 8 m/s in particular, there are already relatively many measured values. Above a wind velocity of 10 m/s, there are no measured values in the shown example yet, as is illustrated by the squares represented on the X-axis.

Finally, the adapted characteristic values of the effective power are represented in the diagrams as circles. In the following, the adaptation of the predetermined characteristic values will be explained. The result of the adaptation can best be recognised in the magnification in FIG. 3.

In the shown example, the predetermined characteristic value was adapted by means of the analysing equipment 5 below a limit number of 80 measurements for a certain wind velocity portion, by calculating a weighted arithmetic mean from the characteristic value of the effective power from the predetermined characteristic curve for the power and the measured characteristic values for this wind velocity portion. In this, each measured characteristic value was provided as weight with the reciprocal of the limit number, i.e. $\frac{1}{80}$. The characteristic value from the predetermined characteristic curve was provided with the weight $$\frac{80-n}{80},$$

wherein n is the number of the measurements performed for the respective wind velocity portion and 80 is the limit number.

For those wind velocities or wind velocity portions, respectively, for which there was no measured characteristic value yet (i.e., wind velocities greater than 10 m/s in particular), the characteristic value from the predetermined characteristic curve was selected as the adapted characteristic value by the analysing equipment. Thus, the plant 1 could be started up in full extent instantly after the installation at the respective location. For such wind velocities or wind velocity portions, respectively, for which there were 80 or more measured characteristic values, the arithmetic mean of the measured characteristic values was calculated as the adapted characteristic value, without taking into account the characteristic value from the predetermined characteristic curve in the calculation. In the shown example, this was the case at three wind velocity portions, namely, around 5.5 m/s, around 6 m/s and around 6.5 m/s.

The characteristic values adapted in this manner form the basic values of the adapted characteristic curve represented in circles. Between these basic values, an interpolation was carried out, so that the adapted characteristic curve 9 was obtained. On the basis of this adapted characteristic curve for the effective power, a reliable operation of the wind energy plant 1 is possible, in particular a reliable determination of a control reserve of the effective power of the plant 1 at the conditions actually prevailing on its installation location.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for determining an adapted characteristic curve (9) for an electric variable selected from the group consisting of ($P_{el}$, Q, $\phi$, cos $\phi$, $I_p$, and $I_Q$) of a wind energy plant (1), wherein the characteristic curve (9) contains characteristic values of the electric variable selected from the group consisting of ($P_{el}$, Q, $\phi$, cos $\phi$, $I_p$, and $I_Q$) depending on different values of a wind ($v_w$), comprising the steps of:
   measuring at least one characteristic value of the electric variable of the group consisting of ($P_{el}$, Q, $\phi$, cos $\phi$, $I_p$, and $I_Q$) for at least one value of the wind ($v_w$) using a measuring device (3);
   adapting for the at least one value of the wind ($v_w$), a characteristic value of the electric variable selected from the group consisting of ($P_{el}$, Q, $\phi$, cos $\phi$, $I_p$, and $I_Q$) from a predetermined characteristic curve (7), containing characteristic values of the electric variable selected from the group consisting of ($P_{el}$, Q, $\phi$, cos $\phi$, $I_p$, and $I_Q$) as a function of different values of the wind ($v_w$), taking into account the characteristic value measured for the at least one value of the wind ($v_w$), to obtain the adapted characteristic curve (9);
   further characterised in that the number (n) of the characteristic values of the electric variable selected from the group consisting of ($P_{el}$, Q, $\phi$, cos $\phi$, $I_p$, and $I_Q$) measured for one value of the wind ($v_w$) is established and the adaptation of the characteristic value is performed depending on the number (n) of the measured characteristic values measured for the respective value of the wind ($v_w$), and
   further characterised in that the characteristic value of the predetermined characteristic curve (7) and the at least one measured characteristic value are weighted in a calculation of the adapted characteristic value, provided that the number (n) of the characteristic values of the electric variable selected from the group consisting of ($P_{el}$, Q, $\phi$, cos $\phi$, $I_p$, and $I_Q$) measured for the respective value of the wind ($v_w$) is below a limit number.

2. A method according to claim 1, characterised in that the adapted characteristic value is calculated by calculating a weighted arithmetic mean of the characteristic value of the electric variable ($P_{el}$, Q, $\phi$, cos $\phi$, $I_p$, $I_Q$) from the predetermined characteristic curve (7) and the at least one measured characteristic value, provided that the number (n) of the characteristic values of the electric variable ($P_{el}$, Q, $\phi$, cos $\phi$, $I_p$, $I_Q$) measured for the respective value of the wind ($v_w$) is below the limit number.

3. A method according to claim 1, characterised in that the measured characteristic value of the electric variable ($P_{el}$, Q, $\phi$, cos $\phi$, $I_p$, $I_Q$) enters with the weight $$\frac{1}{n_{Ges}}$$

into a calculation of the adapted characteristic value, and the characteristic value of the electric variable ($P_{el}$, Q, $\phi$, cos $\phi$, $I_p$, $I_Q$) from the predetermined characteristic curve (7) enters with the weight $$\frac{n_{Ges} - n}{n_{Ges}}$$

into the calculation of the adapted characteristic value, wherein n is the number of the characteristic values of the electric variable ($P_{el}$, Q, $\phi$, cos $\phi$, $I_p$, $I_Q$) measured for the respective value of the wind ($v_w$), and $n_{Ges}$ is a number for which applies: $n_{Ges} \geq n$.

4. A method according to claim 3, characterised in that the number $n_{Ges}$ is equal to the limit number.

5. An apparatus for determining an adapted characteristic curve (9) for an electric variable selected from the group consisting of ($P_{el}$, Q, φ, cos φ, $I_p$, and $I_Q$) of a wind energy plant (1), wherein the characteristic curve (9) contains characteristic values of the electric variable selected from the group consisting of ($P_{el}$, Q, φ, cos φ, $I_p$, and $I_Q$) depending on different value of a wind ($v_w$), the apparatus comprising:

a measuring equipment (3), by which at least one characteristic value of the electric variable selected from the group consisting of ($P_{el}$, Q, φ, cos φ, $I_p$, and $I_Q$) can be measured for at least one value of the wind ($v_w$), an analysing equipment (5), by which a characteristic value of the electric variable selected from the group consisting of ($P_{el}$, Q, φ, cos φ, $I_p$, and $I_Q$) from a predetermined characteristic curve (7) containing characteristic values of the electric variable selected from the group consisting of ($P_{el}$, Q, φ, cos φ, $I_p$, and $I_Q$) as a function of different values of the wind ($v_w$) is adaptable for the at least one value of the wind ($v_w$), taking into account the characteristic value measured for the at least one value of the wind ($v_W$)), to obtain the adapted characteristic curve (9);

further characterised in that by the analysing equipment (5), the number (n) of the characteristic values of the electric variable selected from the group consisting of ($P_{el}$, Q, φ, cos φ, $I_p$, and $I_Q$) measured for one value of the wind ($v_w$) can be established and the adaptation of the characteristic value through the analysing equipment (5) can be performed depending on the number (n) of the measured characteristic values measured for the respective value of the wind ($v_w$).

6. An apparatus according to claim 5, characterised in that the characteristic value of the predetermined characteristic curve (7) and the at least one measured characteristic value is weighted in a calculation of the adapted characteristic value by the analysing equipment (5), provided that the number (n) of the characteristic values of the electric variable ($P_{el}$, Q, φ, cos φ, $I_p$, $I_Q$) measured for the respective value of the wind ($v_w$) is below a limit number.

7. An apparatus according to claim 6, characterised in that the adapted characteristic value is calculable in that a weighted arithmetic mean of the characteristic value of the electric variable ($P_{el}$, Q, φ, cos φ, $I_p$, $I_Q$) from the predetermined characteristic curve (7) and the at least one measured characteristic value is calculable by the analysing equipment (5), provided that the number (n) of the characteristic values of the electric variable ($P_{el}$, Q, φ, cos φ, $I_p$, $I_Q$) measured for the respective value of the wind ($v_w$) is below the limit number.

8. An apparatus according to claim 5, characterised in that the measured characteristic value of the electric variable ($P_{el}$, Q, φ, cos φ, $I_p$, $I_Q$) enters with the weight $$\frac{1}{n_{Ges}}$$

into a calculation of the adapted characteristic value, and the characteristic value of the electric variable ($P_{el}$, Q, φ, cos φ, $I_p$, $I_Q$) from the predetermined characteristic curve (7) enters with the weight $$\frac{n_{Ges} - n}{n_{Ges}}$$

into the calculation of the adapted characteristic value, wherein n is the number of the characteristic values of the electric variable ($P_{el}$, Q, φ, cos φ, $I_p$, $I_Q$) measured for the respective value of the wind ($v_w$), and $n_{Ges}$ is a number for which applies: $n_{Ges} \geq n$.

9. An apparatus according to claim 8, characterised in that the number $n_{Ges}$ is equal to the limit number.

10. An apparatus according to claim 5, characterised in that after reaching a limit number of characteristic values of the electric variable ($P_{el}$, Q, φ, cos φ, $I_p$, $I_Q$) measured for one value of the wind ($v_w$), the characteristic value of the predetermined characteristic curve (7) for this value of the wind ($v_w$) is adaptable by the analysing equipment (5) in that the arithmetic mean of the measured characteristic values is settable as the adapted characteristic value for this value of the wind ($v_w$).

\* \* \* \* \*